United States Patent [19]

Ruellan

[11] Patent Number: 4,546,218

[45] Date of Patent: Oct. 8, 1985

[54] SUSPENSION SYSTEM FOR AN OVERHEAD CONTACT WIRE FOR ELECTRIC TRACTION VEHICLES

[75] Inventor: André Ruellan, Enghien les Bains, France

[73] Assignee: C. Delachaux, Gennevilliers, France

[21] Appl. No.: 557,358

[22] Filed: Dec. 1, 1983

[30] Foreign Application Priority Data

Dec. 8, 1982 [FR] France ................ 82 20560

[51] Int. Cl.[4] ............................................. B60M 1/20
[52] U.S. Cl. ....................................... 191/40; 248/63; 248/74.4; 403/312; 403/344; 403/359
[58] Field of Search .............. 174/40 R, 160; 191/40, 191/41, 42, 43, 44; 248/63, 74.4, 499, 505, 506; 403/312, 344, 359

[56] References Cited

U.S. PATENT DOCUMENTS

| | | | |
|---|---|---|---|
| 1,402,000 | 1/1922 | Matthes | 191/41 |
| 3,644,688 | 2/1972 | Tustin et al. | 191/40 |

FOREIGN PATENT DOCUMENTS

| | | | |
|---|---|---|---|
| 77935 | 9/1949 | Czechoslovakia | 191/40 |
| 376293 | 5/1923 | Fed. Rep. of Germany | 191/40 |
| 462479 | 7/1928 | Fed. Rep. of Germany | 191/40 |
| 534132 | 9/1931 | Fed. Rep. of Germany | 191/40 |
| 534484 | 9/1931 | Fed. Rep. of Germany | . |
| 680896 | 5/1930 | France | . |
| 997755 | 1/1952 | France | . |
| 1016249 | 11/1952 | France | . |
| 2491012 | 4/1982 | France | 191/43 |
| 149224 | 11/1981 | Japan | 191/43 |
| 454209 | 6/1968 | Switzerland | . |

Primary Examiner—Robert B. Reeves
Assistant Examiner—David F. Hubbuch
Attorney, Agent, or Firm—McCormick, Paulding & Huber

[57] ABSTRACT

The present invention relates to a suspension system for an overhead contact wire for electric traction vehicles. The system comprises, in combination, a carrier cable (15) having its mid point connected to a support and having each of its ends connected to respective conductor wire clamps. Each wire clamp comprises a jaw assembly (30) suitable for clamping to a contact wire (10) and including a generally cylindrical housing (41) fitted with inwardly directed teeth (45) on its inside surface. The housing receives an angularly adjustable link member (60) which includes an angle-determining portion (61) provided with complementary teeth and interfitting with the teeth of the housing (41). The link member (60) may be moved axially into and out from the toothed housing (41) so that it may be set in any one of a plurality of angular positions therein, thereby changing the location of a point (70) fastened to the end of the carrier cable (15) relative to the contact wire (10). The carrier cable (15) tends to pull the link member against an axial abutment thus locking it in a selected angular position, and by suitably selecting the angular position, the contact wire may be suspended vertically below the jaw assembly (30) in order to avoid interfering with vehicle pantographs, even where the contact wire is following a curved path thereby causing the plane defined by the carrier cable (15) and the contact wire (10) to be sloping at an angle from the vertical.

12 Claims, 15 Drawing Figures

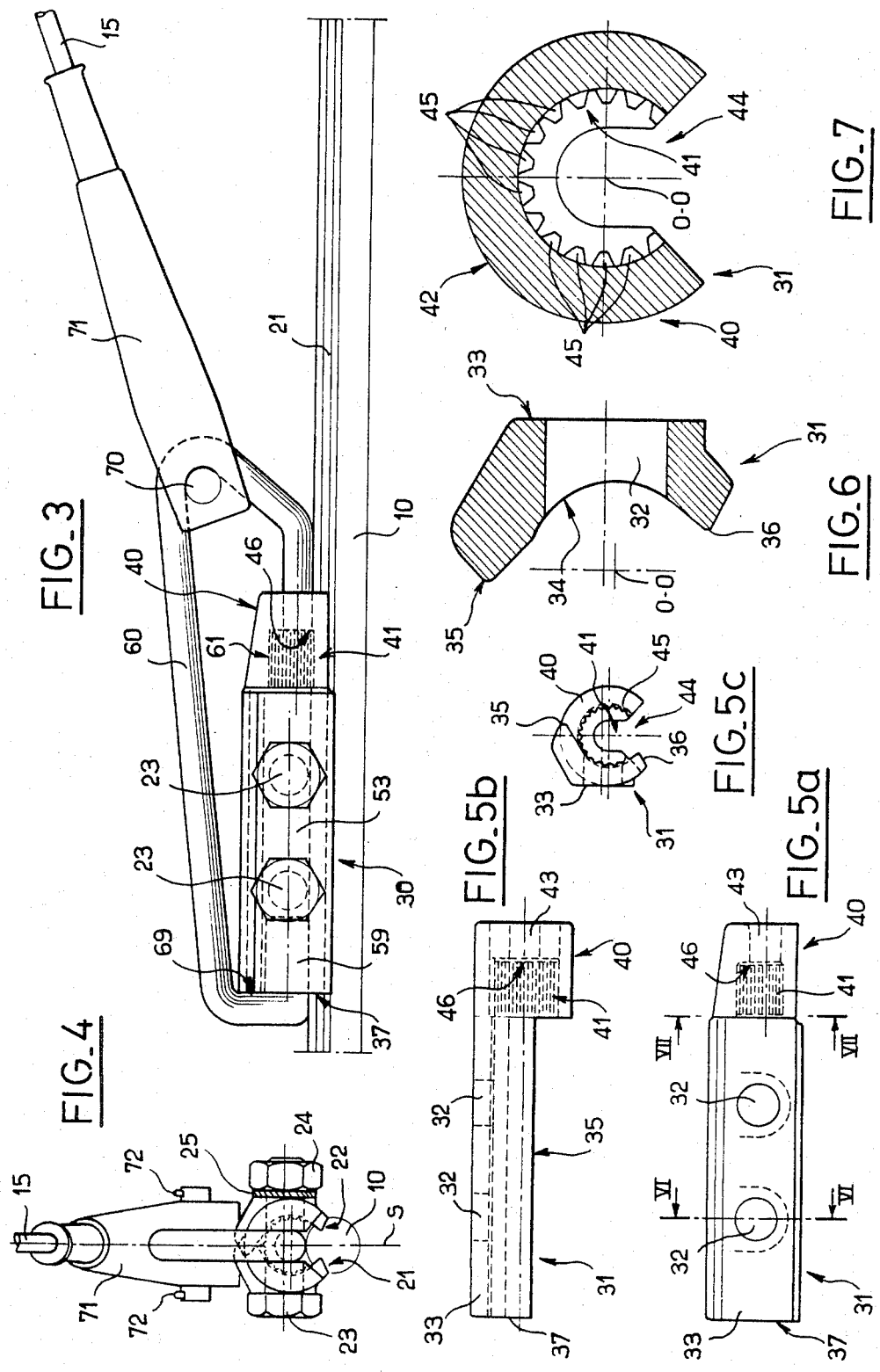

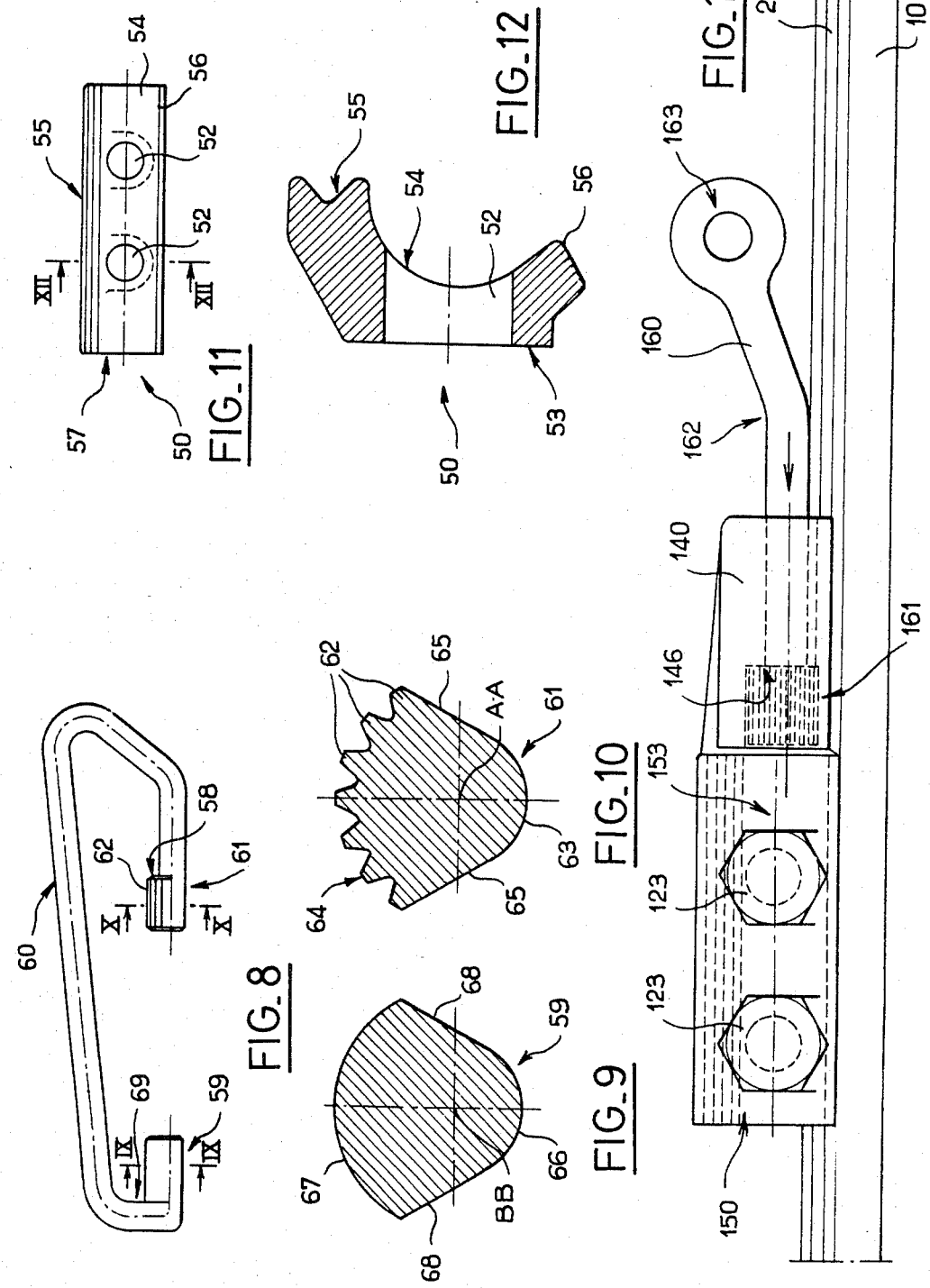

SUSPENSION SYSTEM FOR AN OVERHEAD CONTACT WIRE FOR ELECTRIC TRACTION VEHICLES

The present invention relates to electric traction vehicles powered from an overhead contact wire, such as tramways, trolley-buses, or electric traction public transport vehicles known as light metros. The present invention is applicable, in particular, to electric traction vehicles which make electrical contact by means of a pantograph.

More precisely, the present invention relates to a suspension system for an overhead contact wire for electric traction vehicles.

BACKGROUND OF THE INVENTION

In practice, overhead contact wires are never perfectly rectilinear.

Firstly, public transport electric vehicles are often installed in urban areas where, for most of the time, they have to follow traffic paths which are intended for other types of vehicle.

Secondly, an effort is made during installation to ensure that the overhead wire is not rectilinear so that the device which provides electrical connection between the overhead conductor and the moving receiver, generally a pantograph, does not always rub at the same point on the catenary, thereby avoiding excessive wear of the pantograph contact plate.

For these reasons it is necessary to provide systems capable of counteracting or balancing the radial tension applied to the contact wire at curved portions thereof.

Accompanying FIG. 1 thus shows a conventional system for balancing the radial tension imposed on a contact wire. Such a system is shown, for example, in the publication "S.N.C.F.—LIGNES AERIENNES DE TRACTION ELECTRIQUES EN COURANT MONOPHASE 25 KV—50 Hz—PRINCIPE ET MATERIEL—1979", page 127, FIG. 122 (OVERHEAD ELECTRIC TRACTION LINES FOR SINGLE PHASE 25 KV—50 Hz, BY FRENCH STATE RAILWAYS).

FIG. 1 shows a generally vertical post 1 to which a generally horizontal bracket 2 is fixed. The bracket is further supported by a stay 4 connecting the top of the post 1 and the free end of the bracket 2.

The contact wire is referenced 10 in FIG. 1. The contact wire 10 is supported by means of a carrier cable 5 having its mid point 7 connected to the end of bracket 2 and having its ends connected to the contact wire 10 on either side of the bracket 2 by means of respective clamps 8.

As has been mentioned above, the system must also be adapted to balance the radial tension $F_R$ imposed on the contact wire. More precisely, the system must be suitable for balancing the tension $F_R$ which results from the weight $F_p$ of the length of contact wire 10 corresponding to the two half-spans on either side of the post 1 together with a pure radial tension $F_r$ imposed on the contact wire 10 in the horizontal plane thereof and relative to the axes of the path or of the rolling stock.

To do this, as has been shown in FIG. 1, the conventional solution consists in providing a return arm 9 which is hinged to the bracket 2 by a hing 11, whereby the return arm is free to pivot in a substantially vertical plane. Further, the free end of the return arm is connected at 12 to the contact wire 10 by means of a clamp.

More precisely, the pivot point 11 of the return arm 9 on the bracket 2 and the length of the return arm 9 are determined in such a manner that the return arm 9 is situated substantially along the line of action of the resultant radial tension $F_R$ mentioned above.

Furthermore, as is explained in the above-mentioned publication, the point 7 where the carrier cable 5 is attached to the bracket 2 is situated vertically above the clamp 12 connecting the return arm 9 to the contact wire 10.

In practice, it is observed that such return arms for balancing the radial tension imposed on the contact wire 10 need to be installed on practically every suspension point.

Naturally, it will readily be understood that such installation is relatively expensive, particularly since in many applications double isolation is required between the contact wire and ground, which often means that the return arm must be made of electrically insulating material. Further, the weight of the return arm, and the radial tension acting on a single point of the contact wire, a "hard point" of reduced flexibility is created in the contact wire beneath the bracket 2. Furthermore, such return arms are not very satisfactory from the aesthetic point of view.

One proposal for solving this problem has been to do without the return arm 9 and to support and return the contact wire 10 by means of a support cable 5 which is connected by its mid point to the bracket 2 and which is connected to the contact wire 10 on either side of the bracket 2 by means of clamps which are clamped to the contact wire 10 and which include respective suspension arms that pivot about a vertical axis with the ends of the support cable 5 being connected to the free ends of the said arms.

In such a case, the point at which the carrier cable is connected to the bracket is no longer vertically above the contact wire.

More precisely, depending on the angle through which the contact wire is deviated, the suspension arm is pivoted about the vertical axis through an angle such that the traction force due to the carrier cable 5 passes through the clamping point of said clamps.

Such an arrangement is not entirely satisfactory, firstly since the suspension arms are subjected to high stress and the assembly is thus not very reliable, and secondly because it is necessary to adjust the length of the carrier wire 5 on site as a function of the degree of curvature, and thus to crimp the ends of the carrier cable outside a workshop which is long, expensive and, again, not very reliable.

A similar system is described in Swiss Pat. No. 454 209 with reference to its FIG. 2 which is mentioned as being representative of the state of the art. This Swiss patent further describes a solution in which the clamps are fitted with shackles which are in turn connected to a support by means of drop arms.

As stated in the text of said Swiss patent, the shackle is inclined relative to the vertical in such a manner that the axis of the drop arm intersects the axis of the contact wire.

This requires the jaws of the clamps fitted to the contact wire to be loosened on site.

As a result, it is particularly difficult to adjust such an assembly since the clamps are only attached to the contact wire after adjustments have been made.

In practice, it has been observed that the solutions described above are not widely used because of the many drawbacks they entail, and that the vast majority of current installations use suspension systems of the type shown in FIG. 1.

As is also described in U.S. Pat. No. 1,402,000 and in French Pat. No. 997 755, proposals have also been made for suspension systems for overhead lines which include in combination jaws suitable for clamping to the contact wire and a drop arm associated therewith.

More precisely, the devices described in these documents are intended to be used for supporting a contact wire which is suspended from a catenary, i.e. for an electric power supply line which includes a continuous carrier cable.

In consequence, the drop arms connecting the contact wire to the carrying catenary cable are mounted perpendicularly to the contact wire and the carrier cable and are adjustable relative to the clamps in such a manner that the plane of symmetry of the clamps remains vertical regardless of the angle at which the drop arms may be inclined in vertical planes running perpendicularly to the planes of symmetry through the clamps.

In addition to requiring the clamps to be loosened for the angles to be adjusted as a function of the line geometry, such devices are inapplicable to suspension systems that do not include a continuous catenary carrier cable.

Preferred embodiments of the present invention provide a suspension system for an overhead contact wire which is much simpler and cheaper than prior art systems and which is also less ugly, stronger and more reliable. In particular, the invention does not require a continuous carrier cable, but only requires lengths of carrier cable in association with each support point.

SUMMARY OF THE INVENTION

The present invention provides a suspension system for an overhead contact wire for electric traction vehicles, the system comprising a carrier cable having a mid point connectable to a support and having clamping means at each end for clamping to respective points along an overhead contact wire to be suspended from said support, the improvement wherein:

each of said clamping means comprises a jaw assembly for clamping to the contact wire and a link member for connecting said jaw assembly to one end of said carrier cable;

said jaw assembly and said link member including respective interfitting sets of teeth disposed over at least a portion of an arc of a cylinder defining an axis 0—0 running parallel to the axis of a contact wire when clamped in said jaw assembly, said teeth extending parallel to said axis whereby said link member may be displaced axially relative to said jaw assembly when said jaw assembly is clamped to a contact wire to move said teeth into and out of interfitting engagement, thereby enabling said link member to be set in a selected one of a plurality of different angles about said axis 0—0;

said jaw assembly and said link member further including co-acting abutment surfaces to prevent said teeth from moving out of engagement in one axial direction; and said link member further including fastening means for fastening to one end of said carrier cable. Preferentially said fastening means are both radially offset from said axis 0—0 and axially displaced from said jaw means to a location such that, in an installed overhead contact system, axial tension applied to said fastening means by said carrier cable tends firstly to urge said abutment surfaces into contact against each other and secondly to cause the line of force acting along said cable to intersect the contact wire where it is clamped in said jaws;

the arrangement being such that, when the suspension system is used to support a contact wire following a curved path such that the carrier cable is caused to slope away from the vertical in order to compensate for the horizontal component of the forces in the contact wire, said link member is capable of being set to an angle about said axis 0—0 such that the contact wire takes up a position substantially vertically below said jaw assembly, thereby avoiding interference with pickup means of vehicles drawing electrical power from said overhead contact wire.

In a first embodiment said link member comprises a C-shaped open loop of rod having an angle-determining portion with said teeth at one of its ends and having hook-shaped means at its other end suitable for insertion between said jaws.

Preferably, said hook-shaped means extend between said jaws over a greater distance than the length of the toothed portion at the other end of the open loop.

Advantageously, the fastening means for fastening the link member to the carrier cable are constituted by said loop of rod.

In a varient embodiment, said link member comprises a slightly bent rod having a toothed angle-determining portion located at one of its ends and having said fastening means located at its other end.

The toothed portion of the jaw assembly may comprise the inside surface of a generally cylindrical housing about the axis 0—0, said teeth extending over a major portion of the arc of said cylindrical housing and a minor portion of said arc constituting an opening which is wide enough to pass a rod of said link member.

Preferably, said co-acting abutment surfaces are constituted by an end wall of said housing and by a radially extending abutment surface on said toothed angle-determining portion. Further, the hook-shaped means provided at the other end of the C-shaped open loop link member also include a radially directed surface facing said fastening means and intended to come into abutment against an end surface of said jaw assembly.

As will appear more clearly on reading the following description, a suspension system in accordance with the present invention enables return arms 9 to be completely omitted without drawback, and also enables the same length of carrier cable to be used throughout the system, in other words there is no need to adjust the length of each carrier cable on site as a function of the local geometry of the overhead wire.

BRIEF DESCRIPTION OF THE DRAWINGS

Embodiments of the invention are described by way of example with reference to the accompanying drawings, in which:

FIG. 3 is a side view on a larger scale of clamping means for use in a suspension system in accordance with the present invention and located in the regions marked A of FIG. 2;

FIG. 4 is an axial end view of the clamping means shown in FIG. 3;

FIGS. 5a, 5b and 5c are respectively a side view, a top view and an axial end view of a first jaw used in the clamping means;

FIG. 6 is a section through said jaw on a line marked VI—VI in FIG. 5a;

FIG. 7 is a section through said jaw on a line marked VII—VII in FIG. 5a;

FIG. 8 is a side view of a first angularly adjustable link member for use in clamping means in accordance with the invention;

FIG. 9 is a section through the FIG. 8 link means on a line marked IX—IX in FIG. 8;

FIG. 10 is a section through said link means on a line marked X—X in FIG. 8;

FIG. 11 is a side view of a second jaw for the clamping means in accordance with the present invention;

FIG. 12 is a section through said second jaw on a line marked XII—XII in FIG. 11; and FIG. 13 is a side view of second clamping means in accordance with the present invention.

MORE DETAILED DESCRIPTION

Figure 1:
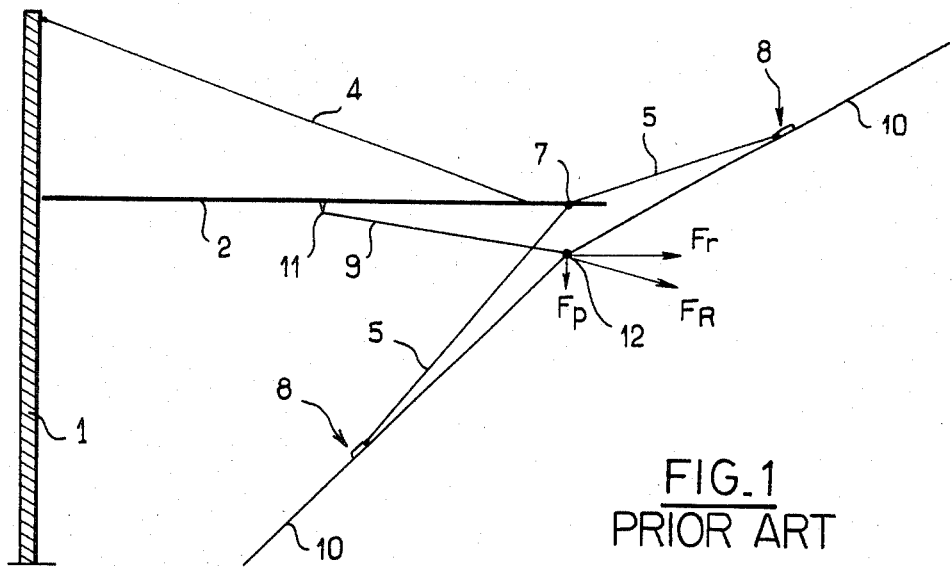
FIG. 1 is a diagram showing a prior art support system and already described.
Figure 2:
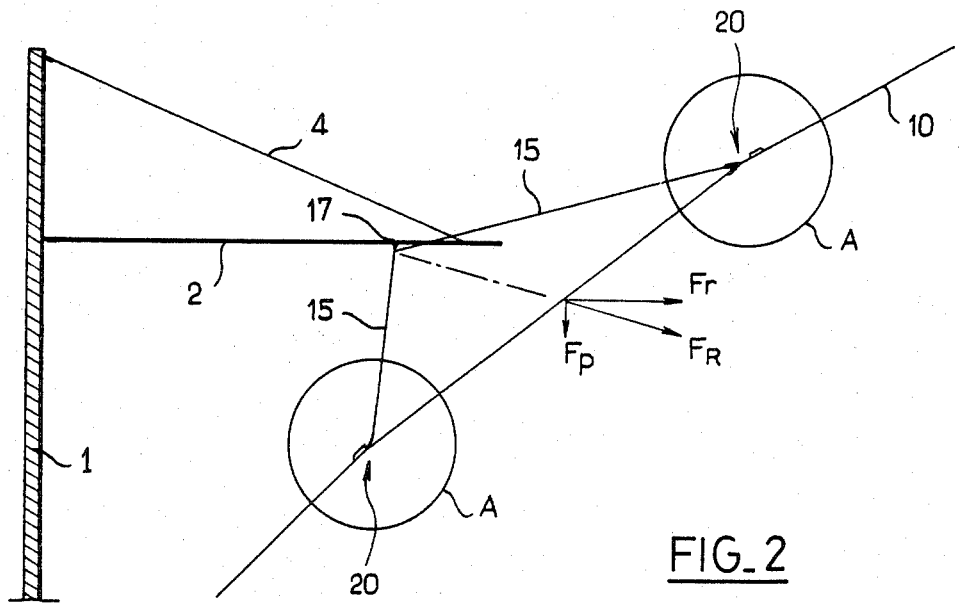
FIG. 2 is a diagram of a support system in accordance with the present invention.

FIG. 2 shows a suspension system in accordance with the invention for a contact wire 10. The system includes a conventional post 1, bracket 2 and stay 4 as already described with reference to FIG. 1.

As can be seen in FIG. 2, the Applicant has observed that it is possible to do without the return arm 9 while still supporting the weight of the contact wire 10 and counteracting the radial force applied thereto. To do this, a carrier cable 15 which is preferably of the same length for all the support systems on the path of the contact wire 10 is connected via its mid point 17 to the bracket 2 and via its ends to respective clamping means 20 which are clamped to two points along the contact wire 10.

More precisely, when the support system is set up, the line of force of the above-described radial tension $F_R$ must pass through the mid point 17 where the carrier cable 15 is connected to the bracket 2.

In other words, the line of action of the radial tension $F_R$ lies in the plane defined by the two arms of the carrier cable 15 and the length of contact wire 10 situated between the clamping means 20. An essential feature of a properly set up support system is that all the lengths of cable and conductor wire are under tension.

The clamping means 20 used in a suspension system for overhead cables in accordance with the present invention are described with reference to FIGS. 3 to 12.

The clamping system 20 comprises a jaw assembly 30 suitable for clamping to the contact wire 10 together with an angularly-adjustable link member 60 which cooperates with the jaw assembly.

In conventional manner the contact wire 10 has two longitudinally-extending grooves 21 and 22 which are not diametrically opposite to each other but which are symmetrically disposed about a plane of symmetry S passing through the axis of the wire. This can be seen best in FIG. 4 which shows the conductor wire 10 in cross section.

It is essential for the plane of symmetry S to remain substantially vertical over the entire length of the conductor wire 10 to ensure that the substantially-horizontal wiper surface of a pantograph rubs only against the contact wire and never against the clamping means from which it is suspended, regardless of the curves in the contact wire and regardless of the oscillations to which it is inevitably subjected by the pantograph of a moving vehicle.

As can be seen in FIGS. 5a, 5b, 5c, 6 and 7, and also in FIGS. 11 and 12, the jaw assembly 30 comprises two separate parts 31 and 50. FIGS. 5a, 5b and 5c show three different views of the jaw 31 and FIGS. 11 and 12 show two views of the jaw 50 corresponding to FIGS. 5a and 6 respectively. Each of the jaws 31 and 50 has two bolt-receiving holes 32 or 52 through which two bolts 23 are passed to clamp the jaws on the contact wire 10 in such a manner that the jaw assembly 30 has a plane of symmetry which coincides with the plane of symmetry S of the contact wire 10 and the bolts 23 extend perpendicularly thereto.

More precisely, the jaws 31 and 50 of the jaw assembly 30 are brought together by tightening nuts 24 (See FIG. 4) on the bolts 23 with respective lock washers 25 being placed next to the nuts 24.

As can be seen in FIGS. 6 and 12, each of the jaws 31 and 50 has a plane outside surface 33 or 53 respectively and an inside cylindrical concave surface 34 or 54 extending an angle of about 150°.

The said inside concave cylindrical surfaces 34 and 54 cooperate, when the jaws are assembled, with the contact wire 10 to define a chamber whose function is explained further on in the present description.

Along their top edges, the jaws 31 and 50 are advantageously provided with complementary mating structures, such as a projection 35 on the jaw 31 and a complementary hollow 55 on the jaw 50 to enable the jaws to be placed relative to each other rapidly and accurately for clamping. The said complementary structures form a mating ridge and furrow that run parallel to the contact wire 10.

Along their bottom edges, the jaws 31 and 50 are provided with longitudinally-extending inwardly-projecting corrugated ridges 36 and 56 which are complementary to the grooves 21 and 22 provided in the contact wire 10. The corrugations are not shown in the figures.

The shape of the ridges 36 and 56 is not described in greater detail herein since it is readily determined by the person skilled in the art as a function of the particular standardised contact wire section chosen for a given installation.

Naturally, in order to make allowance for the thickness of the contact wire 10, the ridges 36 and 56 which are intended to engage the grooves 21 and 22 are set back an appropriate distance from the plane of symmetry S, taken as a reference plane, relative to the above-mentioned interfitting projection 35 and hollow 55.

Further, the jaw 31, hereinafter referred to as the main jaw, is extended axially by a structure 40 which defines a housing 41 for receiving and retaining the angularly adjustable link member 60.

As can be seen in FIG. 7 in particular, the outer surface of the structure 40 is constituted by a generally cylindrical envelope 42, while its inner surface defines a substantially cylindrical housing 41 about an axis 0—0 parallel to the axis of the contact wire 10 when the jaw assembly is clamped thereto. Further, one end of the housing 41 opens into the above-mentioned chamber inside the jaw assembly 30 and, in particular, has the same diameter as the wall constituted by the concave cylindrical surfaces 34 and 54. The other end of the chamber 41 extends by means of a bore 43 which is coaxially therewith but of smaller diameter to the outside of the jaw assembly 30. The bore 43 is intended to receive a rod portion of circular section of the link member 60 as can be seen in FIG. 3 for example. The bore 43 is arranged to hold the circular rod parallel to the contact wire 10 and in contact therewith along its top edge between the ridges 36 and 56. The housing 41 extends over an angle of about 270° about the axis 0—0.

The housing 41 and the bore 43 are thus open over an angle of about 90° where they lie against the contact wire 10. This opening 44 extends the entire length of the structure 40 and is symmetrically disposed about the plane of symmetry of the jaw assembly 30. It is wide enough to receive the end of the link member 60.

As is also visible in FIG. 7, the surface of the housing 41 has a series of inwardly-projecting teeth 45. These teeth engage, in operation, a matching series of outwardly-projecting teeth on the end of the link member 60 as received in the housing 41.

As shown in FIGS. 8 to 10, the angularly-adjustable link member 60 comprises a generally C-shaped open loop of metal rod. One of its ends 61 has a series of outwardly-projecting teeth 62 extending over an arc of about 75°. These are the teeth which engage the teeth 45 that project inwardly from the surface of the housing 41. This arrangement enables the link member 60 to take up a plurality of predetermined angular positions relative to the housing 41.

The end 61 is defined by an envelope comprising a first sector of cylindrical wall 63 about an axis A—A which is the same as the axis for the cylindrical rod-shaped portion of the link member and which is of the same diameter, a second cylindrical wall sector 64, likewise about the axis A—A but at a greater radius therefrom, and plane side walls 65 which interconnect the first and second cylindrical sector walls 63 and 64 respectively and which are tangential to the first cylindrical wall 63. The radius of the second cylindrical sector 64 is the same as the radius of the housing 41 in the structure 40, and the radius of the first sector 63 is equal to the distance between the axis 0—0 and the top surface of the contact wire 10 when the system is assembled. The teeth 62 are provided in the second cylindrical surface 64.

It will readily be understood that the angularly-adjustable link member 60 may be rotated about the axis 0—0 through an angle which is determined by the points at which one or other of the plane surfaces 65 comes into tangential contact with the contact wire 10.

At the other end 59 of the open loop link member 60, as shown in FIG. 9, there is an end portion of similar shape defined by an envelope comprising a smaller cylindrical wall portion 66 and a larger cylindrical wall portion 67 both about an axis B—B which is coaxial with the axis A—A and which have the same radiuses as the first and second sectors 63 and 64 respectively. The cylindrical surfaces 66 and 67 are likewise interconnected by plane walls 68 which are tangential to the smaller cylindrical surface 66. There are no teeth at the second end 59.

Since the radius of the larger sector 67 is equal to the radius of the inside cylindrical surface 34, 54 and since the smaller cylindrical sector 66 is applied against the contact wire 10 over the same range of possible angles for the angularly-adjustable link member 60 as is the first cylindrical surface 63 at the other end of the link member, this second end 59 of the link member 60 constitutes hook-shaped means which enter and fit between the jaws 31 and 50.

As shown in FIG. 8, the hook-shaped means include an outwardly directed radial surface 69 which bears against the opposite end 37, 57 of the jaw assembly 30 to the end including the structure 40.

Thus, when the link member 60 is inserted in the jaw assembly 30, the first end 61 is in contact by means of its teeth 62 with the teeth 45 in the housing 40 and by means of its first cylindrical surface 63 with the contact wire 10. At the same time, the other end 59 is in contact via its larger cylindrical sector 67 with the complementary cylindrical walls 34 and 54 of the jaws 31 and 51 and via its smaller cylindrical sector 66 with the contact wire 10. The angularly-adjustable link member 60 is thus rigidly held at one of a plurality of possible predetermined angular positions about the axis 0—0. The link member may be thus rotatable through an angle of 60° on either side of the plane of symmetry through the jaw assembly 30.

As can be seen in FIG. 3, the angularly-adjustable open loop link member 60 is intended to receive a pin 70 held in a fork 71 by means of cotter pins 72 (see FIG. 4) or similar devices. The fork 71 is fastened to the end of the carrier cable 15.

The link member 60 is shaped in such a manner that the projection of the carrier cable 15 passes, when the suspension system is assembled, substantially half-way between the bolts 23 at the point where the jaw assembly 30 can be deemed to be clamped to the contact wire 10.

Further, the distance between the structure 40 and the nearer of the bolts 23 is greater than the axial length of the end portion 61 of the link member, whereby an empty space is left between the jaws 31 and 50 capable of receiving the entire toothed end portion 61 of the link member 60. It is thus possible to adjust the angle of the link member 60 by pushing it into the jaw assembly 30 until its teeth have disengaged the teeth in the structure 40 and then rotating the link member while it is disengaged. Once a desired angle has been established, it may be fixed by allowing the tension in the support cable 15 to pull the toothed portion 61 of the link member 60 back into the toothed housing 41.

Preferably, the other end of the link member 60, i.e. the hook-forming end extends into the jaw assembly 30 over a greater length than the length of said toothed section 61, whereby the link member 60 remains firmly held along the axis 0—0 when it is pushed far enough into the jaw assembly to leave it free to rotate as explained above.

As can be seen in FIGS. 3 and 8, the carrier cable end of the toothed section 61 of the link member 60 has a radially-extending surface 58 suitable for abuting against a radial surface 46 at the end of the housing 41 where its radius is reduced to meet the bore 43.

The system described above is used to install a contact wire as follows:

In a first step the toothed end portion 61 of the link member 60 is inserted into the space defined between jaws 31 and 50 by inserting the rod thereof through the opening 44 into the bore 43. Initially the link member may be symmetrically disposed as shown in FIG. 4. The clamping jaw 50 is then clamped to the main jaw 31 by means of the nuts 24 so as to fasten the jaw assembly to the contact wire 10. The toothed end portion 61 of the link member 60 is placed between the jaws 31 and 50 so as to disengage the teeth 62 from the teeth 45 so that a suitable angle may be chosen for the link member 60 relative to the plane of symmetry through the jaw assembly 30 and thus relative to the plane of symmetry S through the contact wire 10. The link member 60 is then drawn longitudinally so that the toothed portion 61 enters the housing 41. The carrier cable 15 may then be connected to the bracket 2 if this has not already been done. The angle of inclination of the angularly-adjustable link member 60 relative to the plane of symmetry S through the jaws when clamped to the contact wire 10 is chosen, as a function of the curve imposed on the contact wire 10 at a given point of support, in such a manner that the plane of symmetry S is substantially vertical. In other words, on a curve, the plane defined by the two arms of the support cable 15 is not vertical but is sloping. That is how the radial component of the force on the conductor wire is counteracted. However, if the link members were locked in the plane of symmetry as shown in FIG. 4, that would result in the conductor wire being tilted to one side so that there would be a danger of the pantographs colliding with the bolts 23 or the nuts 24. A similar configuration would be obtained if the link member were free to rotate in the jaw assembly 30, even though there might be a small tendency for the plane of symmetry to return towards the vertical. The angle between the jaw assembly 30 and the angularly-adjustable link member 60 is chosen so as to force the plane of symmetry S into a substantially vertical position.

Since the angle can be changed merely by pushing the link member into the jaw assembly and turning when the teeth are disengaged before releasing it again, the angle may be adjusted on site with the contact wire already supported by the carrier cable 15. The angle selected is not dependent in any way on a tightening or clamping operation being performed while the system is under tension, thus if an initially-selected angle turns out to be wrong, it is relatively easy to put right subsequently without danger of the parts slipping.

FIG. 13 shows a variant embodiment of the invention.

It uses a jaw assembly which is substantially identical to the jaw assembly 30. In particular, members in FIG. 13 which correspond to members already described bear the same reference numerals increased by 100.

The angularly-adjustable link member 160 shown in FIG. 13 differs from the link member 60 in that it comprises a length of round rod having a small bend 162, with one of its ends (inside the structure 140) having an outer sector 161 provided with outwardly-directed teeth and corresponding to the section 61 described above, and having connection means 163 at its other end in the form of an eye.

The eye is naturally intended to receive the pin 70 at the end of the fork 71 on the carrier cable 15.

For either embodiment the jaws 31 and 50 together with the link member 60 may be made of an alloy of copper and aluminum.

As mentioned above, it is important for the axis about which the toothed section 61 rotates inside the housing 41 to be close to the axis of the contact wire 10.

Naturally the present invention is not limited to the embodiments described, and numerous variants can be devised without going beyond the scope of the claims.

In particular, the one aspect of the invention as claimed relates specifically to the clamping means in addition to the suspension system as a whole.

Finally, the suspension system and the clamping means of the present invention, while being specifically designed for supporting a contact wire on a curve, are also perfectly capable of supporting lengths of contact wire which are perfectly rectilinear.

I claim:

1. In a suspension system for an overhead contact wire for electric traction vehicles, the system comprising a carrier cable having a mid point connectable to a support and having clamping means at each end for clamping to respective points along an overhead contact wire to be suspended from said support, the improvement wherein:

each of said clamping means comprises a jaw assembly for clamping to the contact wire and a link member for connecting said jaw assembly to one end of said carrier cable;

said jaw assembly comprising first and second relatively movable and mutually clampable jaws;

said jaw assembly defining a generally cylindrical housing having an axis 0—0 running parallel to the axis of a contact wire when clamped between the jaws, said axis 0—0 then being close to the axis of the wire, and said housing having inwardly directed teeth projecting from a major portion of its inside surface;

said link member having an angle-determining portion receivable in said housing and having outwardly directed teeth suitable for engaging said inwardly directed teeth and extending over a given sector of the periphery of said angle-determining portion, whereby said link member may be set in any one of a plurality of predetermined angles about said axis 0—0 and relative to said jaw assembly;

said jaw assembly further defining a stop-wall to prevent said angle-defining portion from moving axially in one direction along said axis 0—0 and a space adjacent to said housing for receiving said angle-defining portion when moved in the opposite direction along said axis 0—0, said space being free from obstructions to rotation of said angle-defining portion about said axis 0—0, thereby enabling the angle at which said link member is set to be changed without unclamping the jaw assembly;

said link member further including fastening means for fastening to one end of said carrier cable.

2. A suspension system according to claim 1, wherein said space is defined between said first and second jaws.

3. A suspension system according to claim 1, wherein said link member comprises a C-shaped open loop of rod having said angle-defining portion at one of its ends and having hook-shaped means at its other end suitable for insertion between said jaws.

4. A suspension system according to claim 3, wherein said hook-shaped means extend between said jaws over a greater distance than the length of said angle-determining portion.

5. A suspension system according to claim 3, wherein said fastening means is constituted by said loop of rod.

6. A suspension system according to claim 3, wherein said hook-shaped means include a radially directed surface facing said fastening means and intended to come into abutment against an end surface of said jaw assembly.

7. A suspension system according to claim 1, wherein said link member comprises a slightly bent rod having said angle-determining portion located at one of its ends and having said fastening means located at its other end.

8. A suspension system according to claim 1, wherein said housing has a side opening extending over an arc about said axis 0—0 and wide enough to pass a rod of said link member.

9. A suspension system according to claim 1, wherein said stop-wall constitutes an end wall of said housing and wherein said angle-determining portion includes a radially extending abutment surface for engaging said stop-wall.

10. A suspension system according to claim 1 wherein said axis of rotation 0—0 of said angle-determining portion of said link member in said housing is close to the contact wire when said suspension system is installed.

11. Clamping apparatus for supporting an overhead contact wire from a carrier cable comprising:
   a link member connected between the contact wire and said carrier cable;
   a jaw assembly clamping to the contact wire and to the link member, and having first and second relatively movable and mutually clampable jaws, the jaw assembly further defining a generally cylindrical housing having an axis 0—0 running parallel to the axis of the contact wire when clamped between the jaws of said assembly, said axis 0—0 then being close to the axis of the contact wire, and said housing having inwardly directed teeth projecting from a major portion of its inside surface for engagement with said link member to set said link member in any one of a plurality of desired angles about said axis 0—0 relative to said jaw assembly;
   said jaw assembly further defining a stop wall to prevent the link member received in said housing from moving axially in one direction along the axis 0—0 and a space adjacent to said housing for receiving said link member when moved in the opposite direction along said axis 0—0, said space being free from obstructions to rotation of said link member about said axis 0—0, thereby enabling the angle at which said link member is set in said housing to be changed without unclamping the jaw assembly.

12. A suspension system for an overhead contact wire for electric traction vehicles, the system comprising a carrier cable having a mid point connectable to a support and having clamping means at each end for clamping to respective points along an overhead contact wire to be suspended from said support, the improvement wherein:
   each of said clamping means comprises a jaw assembly for clamping to the contact wire and a link member for connecting said jaw assembly to one end of said carrier cable;
   said jaw assembly and said link member including respective interfitting sets of teeth disposed over at least a portion of an arc of a cylinder defining an axis 0—0 running parallel to the axis of a contact wire when clamped in said jaw assembly, said teeth extending parallel to said axis whereby said link member may be displaced axially relative to said jaw assembly when said jaw assembly is clamped to a contact wire to move said teeth into and out of interfitting engagement, thereby enabling said link member to be set in a selected one of a plurality of different angles about said axis 0—0;
   said jaw assembly and said link member further including co-acting abutment surfaces to prevent said teeth from moving out of engagement in one axial direction; and
   said link member further including fastening means for fastening to one end of said carrier cable, said fastening means being both radially offset from said axis 0—0 and axially displaced from said jaw means to a location such that, in an installed overhead contact system, axial tension applied to said fastening means by said carrier cable tends firstly to urge said abutment surfaces into contact against each other and secondly to cause the line of force acting along said cable to intersect the contact wire where it is clamped in said jaws;
   the arrangement being such that, when the suspension system is used to support a contact wire following a curved path such that the carrier cable is caused to slope away from the vertical in order to compensate for the horizontal component of the forces in the contact wire, said link member is capable of being set to an angle about said axis 0—0 such that the contact wire takes up a position substantially vertically below said jaw assembly, thereby avoiding interference with pick-up means of vehicles drawing electrical power from said overhead contact wire.

* * * * *